US010038780B2

(12) United States Patent
Lee et al.

(10) Patent No.: US 10,038,780 B2
(45) Date of Patent: Jul. 31, 2018

(54) SYSTEM FOR SWITCHING AND OUTPUTTING SENDER-CONTROLLED INCOMING RINGTONE AND METHOD THEREFOR

(71) Applicant: TW MOBILE CO., LTD., Seoul (KR)

(72) Inventors: Se-yong Lee, Seoul (KR); Kyo-sik Hong, Anseong (KR)

( * ) Notice: Subject to any disclaimer, the term of this patent is extended or adjusted under 35 U.S.C. 154(b) by 28 days.

(21) Appl. No.: 14/917,576

(22) PCT Filed: Jul. 18, 2014

(86) PCT No.: PCT/KR2014/006545
§ 371 (c)(1),
(2) Date: Mar. 9, 2016

(87) PCT Pub. No.: WO2015/034174
PCT Pub. Date: Mar. 12, 2015

(65) Prior Publication Data

US 2016/0227027 A1 Aug. 4, 2016

(30) Foreign Application Priority Data

Sep. 9, 2013 (KR) ........................ 10-2013-0108161

(51) Int. Cl.
*H04W 68/00* (2009.01)
*H04M 3/42* (2006.01)
(Continued)

(52) U.S. Cl.
CPC ......... *H04M 3/42017* (2013.01); *H04M 1/57* (2013.01); *H04M 1/72552* (2013.01); *H04M 19/04* (2013.01)

(58) Field of Classification Search
USPC ........................ 455/401, 415, 567, 72, 88.04
See application file for complete search history.

(56) References Cited

U.S. PATENT DOCUMENTS 8,571,607 B1 * 10/2013 Zarrow .................. H04M 3/02 379/207.16
8,644,886 B1 * 2/2014 Delaney ............... H04M 3/533 455/415
(Continued)

FOREIGN PATENT DOCUMENTS

KR 10-2003-0071900 A 9/2003
KR 10-2006-0018177 A 2/2006
(Continued)

*Primary Examiner* — Kathy Wang-Hurst
*Assistant Examiner* — Said Elnoubi
(74) *Attorney, Agent, or Firm* — Patent Office of Dr. Chung Park

(57) ABSTRACT

The present invention provides a system for switching and outputting a sender-controlled incoming ringtone, in which applications transmitting a message to be transmitted to each counterpart of a phone call or text message transmission and automatically setting and outputting the message as the ringtone when a receiver receives the message transmitted by the sender are installed in a sender terminal and a receiver terminal, respectively, such that the message set by the sender is output as the ringtone of the receiver terminal by the control of the sender when making a voice call or transmitting the text message, and a method therefor.

10 Claims, 7 Drawing Sheets

(51) Int. Cl.

| | |
|---|---|
| ***H04M 1/57*** | (2006.01) |
| ***H04M 1/725*** | (2006.01) |
| ***H04M 19/04*** | (2006.01) |

(56) References Cited

U.S. PATENT DOCUMENTS

| | | | | |
|---|---|---|---|---|
| 2004/0092250 | A1* | 5/2004 | Valloppillil | H04L 51/38<br>455/412.1 |
| 2008/0057902 | A1* | 3/2008 | Sidon | H04M 19/04<br>455/401 |
| 2012/0196582 | A1* | 8/2012 | Ahn | H04M 3/42042<br>455/415 |

FOREIGN PATENT DOCUMENTS

| | | | |
|---|---|---|---|
| KR | 10-2006-0041449 | A | 5/2006 |
| KR | 10-1176206 | B1 | 8/2012 |

* cited by examiner

SYSTEM FOR SWITCHING AND OUTPUTTING SENDER-CONTROLLED INCOMING RINGTONE AND METHOD THEREFOR

CROSS-REFERENCE TO PRIOR APPLICATIONS

This application is a national Stage Patent Application of PCT International Patent Application No. PCT/KR2014/006545, filed on Jul. 18, 2014 under 35 U.S.C. § 371, which claims priority of Korean Patent Application No. 10-2013-0108161, filed on Sep. 9, 2013, which is all hereby incorporated by reference in their entirety.

TECHNICAL FIELD

The present invention relates to a system for switching and outputting a sender-controlled incoming ringtone and a method therefor, and more particularly, to a system for switching and outputting a sender-controlled incoming ringtone that improves convenience by transmitting a message to be transmitted to each counterpart of phone call or text message transmission and automatically setting and outputting the message as a ringtone when a receiver receives the message transmitted by a sender, and a method therefor.

BACKGROUND ART

As known, with the recent development of information communication technologies, a development of information providing technologies which provide information on various fields to multiple subscribers through at least one host server via a wide area data communication network in real time has been actively conducted.

Based on the technologies, recently, a peripheral technology, such as a cache memory extension technology for more rapidly providing accurate information to subscribers and an information selection technology and a compression technology providing a more convenient access to taste and preference of subscribers are being developed. Further, these technologies have given impetus to the development of various contents and a solution thereof.

Generally, a coloring service (call ring-back tone service) in which a music is set in a mediation server (not shown) of a telecommunication provider to be output instead of a ring signal for outputting a bell sound, in order to express individuality of a receiver before call connection at the time of phone call, has been released.

Meanwhile, a service for informing a receiver who is calling has also been released. A general caller identification (CID) service is a service in which a phone number of a sending-side user terminal is transmitted to a receiver before call connection to allow the receiver to confirm who is calling.

In addition, to more improve the service that simply informs the caller number, the present applicant has filed a patent application for a service in which ring data (bidirectional coloring data) is produced using various multimedia data, ring data of a sender is transmitted to a receiving-side user terminal, and ring data of the receiver is transmitted to the sending-side user terminal when the sender tries to connect a call to the receiving-side user terminal, and the patent application has been registered as Korean Patent No. 10-602734.

However, when using a mobile communication service, there is a case in which only a simple message needs to be transmitted to a counterpart of phone call or text message transmission.

However, the simple message may not be transmitted to the counterpart of phone call or text message transmission using the ring data. Although it is not impossible, but the ring data is continuously changed in order to transmit the simple message through the ring data, which causes significant inconvenience.

Further, when a call from a user B is received in a state in which a message to be transmitted to a receiving-side user A is set, the service is unavailable since there is possibility that the message to be transmitted to the user A may be transmitted to the user B by the ring data method.

DISCLOSURE

Technical Problem

In consideration of the above-described circumstances, it is an object of the present invention to provide a system for switching and outputting a sender-controlled incoming ringtone, in which applications transmitting a message to be transmitted to each counterpart of a phone call or text message transmission and automatically setting and outputting the message as the ringtone when a receiver receives the message transmitted by the sender are installed in a sender terminal and a receiver terminal, respectively, such that the message set by the sender is output as the ringtone of the receiver terminal by the control of the sender when making a voice call or transmitting the text message, and a method therefor.

Technical Solution

In order to accomplish the above-described object, there is provided a system for switching and outputting a sender-controlled incoming ringtone, including: user terminals 2*a* and 2*b* in which applications transmitting a ringtone message to be output while being converted into a voice to replace a ringtone notifying of an incoming call or a notification signal for arrival of a text message from a sending-side user terminal, receiving the ringtone message at a receiving-side user terminal, and automatically setting and outputting the ringtone message as the ringtone or the notification signal for arrival of a text message, are installed; and a sender-specific incoming ringtone providing server 20 configured to receive and register the ringtone message to be transmitted to each counterpart from a sending-side user terminal 2*a*, receive a call connection request signal or a text message transmission request signal from the application of the sending-side user terminal 2*a*, extract the ringtone message pre-registered for each receiver, and transmit the extracted ringtone message to the receiving-side user terminal 2*b*.

Preferably, the sender-specific incoming ringtone providing server 20 further performs ring data management for transmitting ring data pre-registered by each user to a counterpart's terminal, respectively, at the time of trying to make a voice call or transmit a text message.

Preferably, the ringtone message to be transmitted to each counterpart is text data, recording data, or sound source data of a sender that is input or recorded through the user terminals 2*a* and 2*b*.

Preferably, the sender-specific incoming ringtone providing server 20 is a server configured to receive a voice call signal or a signal informing of text message transmission, the ringtone message and a ringtone setting control signal for a specific receiver from the application of the sending-side user terminal 2_a_, and push the ringtone message to the counterpart receiving-side user terminal 2_b_.

Preferably, the application of the receiving-side user terminal 2_b_ receives a voice call signal generation or text message transmission signal for a specific receiver, or a signal regarding whether a ringtone message for the specific receiver is present from the application of the sending-side user terminal 2_a_, and automatically generates a signal requesting the ringtone message to the sender-specific incoming ringtone providing server 20.

Preferably, the ringtone message transmitted from the sender-specific incoming ringtone providing server 20 further includes sender information and a ringtone setting control signal for the receiving-side user terminal 2_b_.

Preferably, the user terminals 2_a_ and 2_b_ include: a communication module 4 configured to communicate with the sender-specific incoming ringtone providing server 20 and the counterpart user terminal 2_a_ or 2_b_; a ringtone attachment setting unit 8 configured to attach a message output as a ringtone in the receiving-side user terminal 2_b_ by a control of a sender; an automatic sending information transmitter 10 configured to transmit the call connection request signal or the text message transmission signal to the sender-specific incoming ringtone providing server 20; a counterpart application control information transmitter 12 configured to transmit a control signal controlling the application installed in the receiving-side user terminal 2_b_ to download the ringtone message from the sender-specific incoming ringtone providing server 20; a ringtone separator 14 configured to receive the ringtone message from the sender-specific incoming ringtone providing server 20 and separate only ringtone data from the ringtone message; a voice output controller 15 configured to control the ringtone data to be output; a text message reception detector 16 configured to monitor whether text message data is received; a data storage 17 configured to store the application attaching the ringtone message and separating a ringtone from the received ringtone message, and a ringtone setting control data to be transmitted to the counterpart terminal; and a controller 18 configured to control the components to create, attach, transmit data desired to be output as the ringtone in the counterpart terminal, and receive the ringtone message from the counterpart and automatically setting the data as the ringtone to be output.

Preferably, the user terminals 2_a_ and 2_b_ further include: an incoming ringtone recorder 6 configured to record a voice of a receiver as a message to be set as the ringtone of the receiving-side user terminal.

Preferably, the voice output controller 15 is a means for controlling setting of the ringtone and controls the application of the counterpart user terminal so that the ringtone message transmitted by the sender is set as a temporary ringtone one time only and original ringtone setting is automatically restored after outputting the ringtone message.

Preferably, the sender-specific incoming ringtone providing server 20 includes: a communication module 22 configured to communicate with the user terminals 2_a_ and 2_b_; a ring data manager 24 configured to manage the ring data which is information of the counterpart of a call so as to be transmitted to a terminal of the counterpart of the call, respectively; a ringtone attaching processor 26 configured to attach the ringtone data transmitted by a sender to the ring data of the sender to be transmitted to the receiving-side user terminal; a sending signal reception unit 28 configured to receive a sending signal for a specific receiver phone number from the sending-side user terminal 2_a_; a composite ring data transmitter 30 configured to transmit composite ring data including a ringtone; an application download manager 32 configured to manage the application performing attachment of the ringtone message and setting control so as to be downloaded to the user terminals 2_a_ and 2_b_; a data storage 34 configured to store the application performing attachment of the ringtone message and setting control in a manner that the application is downloaded by multiple user terminals, and store the ringtone message which is received from the sending-side user terminal and transmitted to the receiving-side user terminal; and a controller 36 configured to control components so that the ringtone message desired by the receiver is transmitted to the sending-side user terminal to replace the ringtone informing of call connection request or a text message arrival notification signal to be output.

Meanwhile, according to the subject invention, there is provided a method for switching and outputting a sender-controlled incoming ringtone, including: a) setting, by an application of a sending-side user terminal 2_a_, a ringtone message by a control of a user; b) transmitting, by the application of the sending-side user terminal 2_a_, the preset ringtone message to a sender-specific incoming ringtone providing server 20; c) registering, by the sender-specific incoming ringtone providing server 20, the ringtone message together with receiver and sender information; d) transmitting, by the application of the sending-side user terminal 2_a_, a notification signal notifying that a sender tries to make a voice call to an application of a receiving-side user terminal 2_b_; e) downloading, by the receiving-side user terminal 2_b_, the ringtone message pre-registered by the sender from the sender-specific incoming ringtone providing server 20; and f) outputting, by the receiving-side user terminal 2_b_, the downloaded ringtone message.

Preferably, in the step a), the ringtone message to be output in a specific receiving-side user terminal 2_b_ is set by selecting sound source data or recording a voice by a sender.

Preferably, the step a) further includes: attaching a receiver phone number to each ringtone message.

Preferably, the step d) includes: transmitting, by the application of the sending-side user terminal 2_a_, a text message transmission notification signal to the application of the receiving-side user terminal 2_b_.

Preferably, the step e) includes: transmitting, by the receiving-side user terminal 2_b_, a sender phone number and a ringtone message transmission request signal to the sender-specific incoming ringtone providing server 20; extracting, by the sender-specific incoming ringtone providing server 20, the ringtone message registered by the sender and ring data of the sender to create composite ring data; and transmitting, by the sender-specific incoming ringtone providing server 20, the composite ring data to the receiving-side user terminal 2_b_.

Preferably, the method further includes: before the step f), separating, by the receiving-side user terminal 2_b_, ring data and the ringtone message of the sender from each other; and setting the ringtone message as a ringtone informing of a voice call or a text message reception notification signal.

Advantageous Effects

In the system for switching and outputting a sender-controlled incoming ringtone and the method therefor according to the embodiment of the present invention, a sender may allow a receiver to output a sound source at the time of outputting a ringtone or a text message reception notification signal as gifts, and in a case of urgent call or urgent text message, the sender may record his/her own voice to replace the ringtone or the text message reception notification signal of the receiver such that the receiver does not reject the call or the text message but may immediately answer the call or read the text message, thereby significantly improving convenience of users.

BEST MODE

Hereinafter, the present invention will be described in detail with reference to the accompanying drawings.

Figure 1:
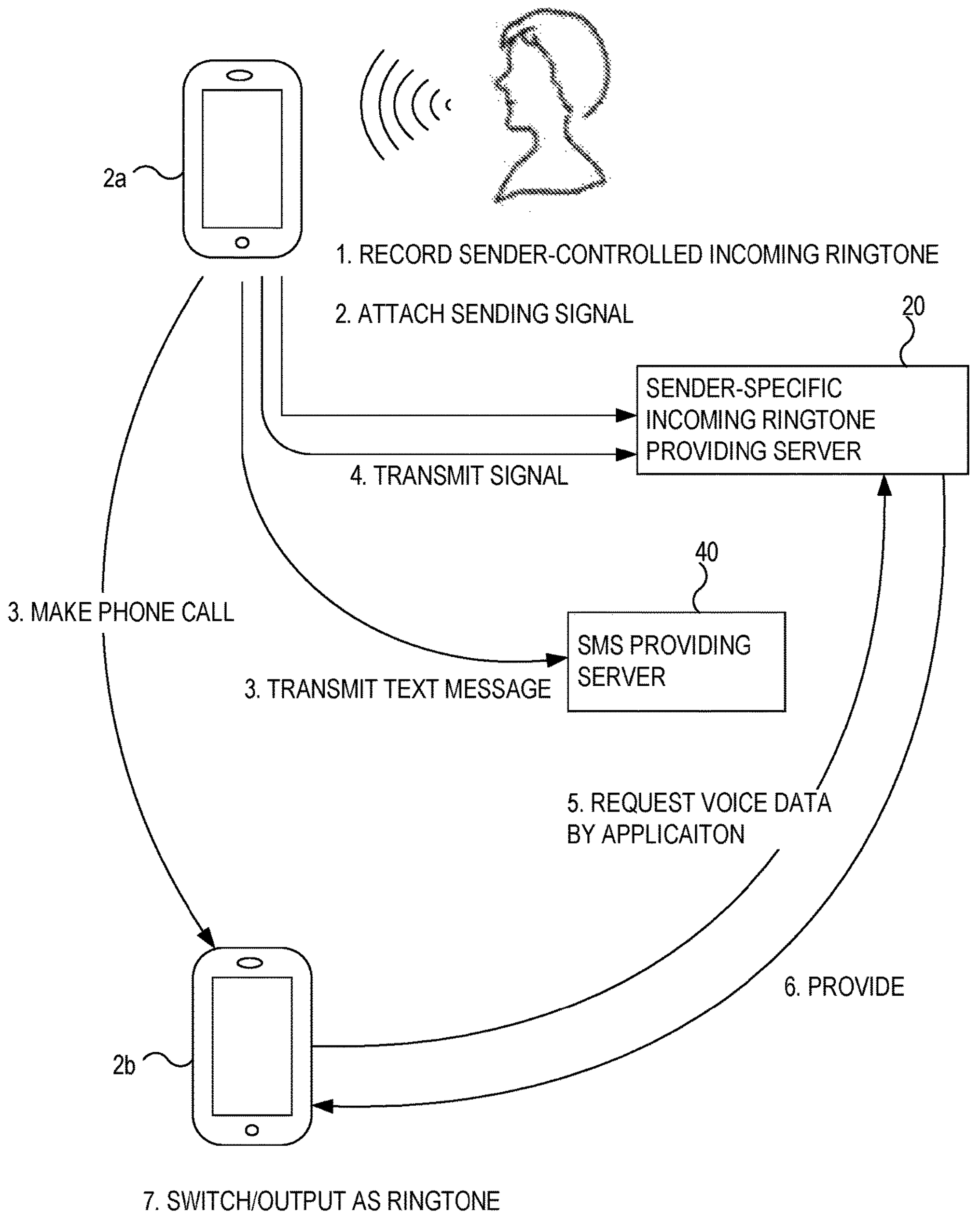
FIG. 1 is a diagram illustrating a switching state of a sender-controlled incoming ringtone using a system for switching and outputting a sender-controlled incoming ringtone according to an embodiment of the present invention.

FIG. 1 is a diagram illustrating a switching state of a sender-controlled incoming ringtone using a system for switching and outputting a sender-controlled incoming ringtone according to an embodiment of the present invention.

Referring to FIG. 1, in the system for switching and outputting a sender-controlled incoming ringtone according to the embodiment of the present invention, applications transmitting a message to be transmitted to each counterpart of a phone call or text message transmission and automatically setting and outputting the message as the ringtone when a receiver receives the message transmitted by the sender are installed in a sender terminal and a receiver terminal, respectively, such that the message set by the sender is output as the ringtone of the receiver terminal by the control of the sender when making a voice call or transmitting the text message, and a method therefor.

More particularly, the system for switching and outputting a sender-controlled incoming ringtone according to the embodiment of the present invention includes user terminals 2*a* and 2*b* in which applications transmitting a ringtone message to be output while being converted into a voice to replace a ringtone notifying of an incoming call or a notification signal for arrival of a text message from a sending side, receiving the ringtone message at a receiving side, and automatically setting and outputting the ringtone message as the ringtone or the notification signal for arrival of a text message, are installed; and a sender-specific incoming ringtone providing server 20 configured to receive and register the ringtone message to be transmitted to each counterpart from the sending-side user terminal 2*a*, receive a call connection request signal or a text message transmission request signal from the application of the sending-side user terminal 2*a*, extract the ringtone message pre-registered for each receiver, and transmit the extracted ringtone message to the receiving-side user terminal 2*b*.

In this case, the sender-specific incoming ringtone providing server 20 further performs ring data management for transmitting ring data pre-registered by each user to a counterpart's terminal, respectively, at the time of trying to make a voice call or transmit a text message.

That is, the system for switching and outputting a sender-controlled incoming ringtone according to the embodiment of the present invention is a system which controls a ringtone or a text message reception notification signal generated in the receiving-side user terminal 2*b* to be changed with data that the receiver desires and output when a sender tries to make a voice call or transmits a text message to a specific receiver.

Such the ringtone or notification signal data is a signal output at the time of trying to make a voice call or transmitting the text message but before the receiver answers a call or reads a text message.

Therefore, the ring data through which the receiver may confirm who is calling is output before outputting the signal, and when the ring data is also collectively managed by the sender-specific incoming ringtone providing server 20, it is more convenient for the users.

In this case, the ringtone message to be transmitted to each counterpart is text data, recording data, or sound source data of the sender that is input or recorded through the user terminals 2*a* and 2*b*. The recording data of the sender is data obtained by recording a voice of the sender.

Further, the sender-specific incoming ringtone providing server 20 is a server which receives a voice call signal or a signal informing of text message transmission, and the ringtone message and a ringtone setting control signal for a specific receiver from the application of the sending-side user terminal 2*a*, and pushes the ringtone message to the counterpart receiving-side user terminal 2*b*.

In this case, the sender-specific incoming ringtone providing server 20 may immediately transmit the ringtone message or the text message reception notification signal when the sending-side user terminal 2*a* tries to make a voice call or transmit a text message to a specific receiving-side user terminal 2*b* by a request of the sending-side user terminal 2*a*.

Further, the sender-specific incoming ringtone providing server 20 may transmit the ringtone message or the text message reception notification signal reversely, that is by a signal transmission request of the receiving-side user terminal 2*b* at the time of trying to make the voice call or transmit the text message. Specifically, this process may be performed in such a manner that, when the sending-side user terminal 2*a* requests call connection or transmits a text message, the application of the sending-side user terminal 2*a* transmits a ringtone message download request signal to the application of the receiving-side user terminal 2*b*, and the application of the receiving-side user terminal 2*b* requests transmission of the ringtone message to the sender-specific incoming ringtone providing server 20.

Meanwhile, the application of the receiving-side user terminal 2*b* receives a voice call signal generation or text message transmission signal for a specific receiver, or a signal regarding whether a ringtone message for the specific receiver is present from the application of the sending-side user terminal 2*a*, and automatically generates a signal requesting the ringtone message to the sender-specific incoming ringtone providing server 20.

In addition, the ringtone message transmitted from the sender-specific incoming ringtone providing server 20 further includes sender information and a ringtone setting control signal for the receiving-side user terminal 2*b*, thereby enabling remote control.

Figure 2:
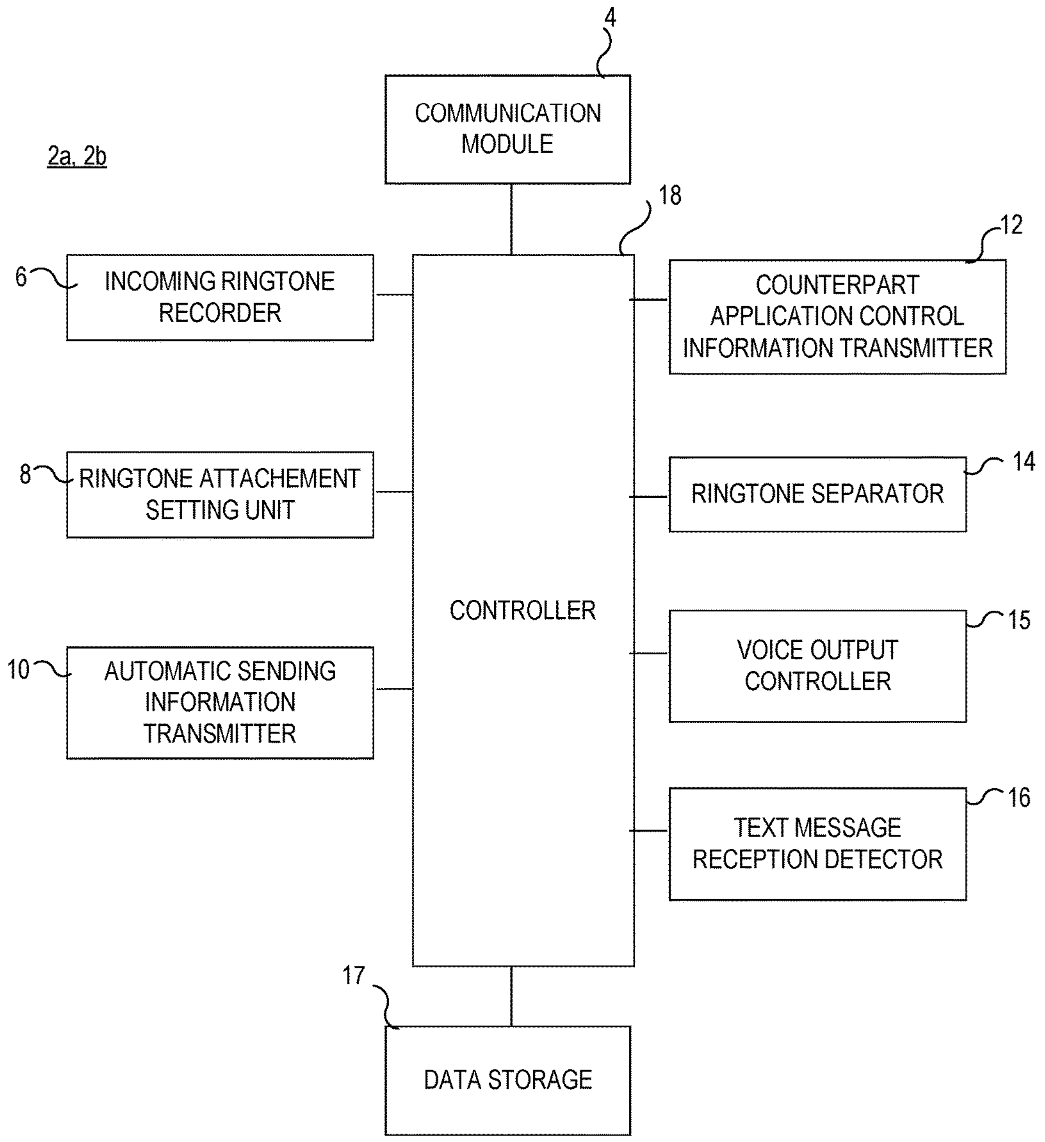
FIG. 2 is a block diagram illustrating a configuration of a user terminal included in the system for switching and outputting a sender-controlled incoming ringtone according to the embodiment of the present invention.

FIG. 2 is a block diagram illustrating a configuration of the user terminal included in the system for switching and outputting a sender-controlled incoming ringtone according to the embodiment of the present invention.

Referring to FIG. 2, the user terminals 2*a* and 2*b* include a communication module 4 configured to communicate with the sender-specific incoming ringtone providing server 20 and the counterpart user terminal 2*a* or 2*b*; a ringtone attachment setting unit 8 configured to attach a message output as a ringtone in the receiving-side user terminal 2*b* by a control of the sender; and an automatic sending information transmitter 10 configured to transmit a call connection request signal or a text message transmission signal to the sender-specific incoming ringtone providing server 20.

The user terminals 2*a* and 2*b* further include a counterpart application control information transmitter 12 configured to transmit a control signal controlling the application installed in the receiving-side user terminal 2*b* to download the ringtone message from the sender-specific incoming ringtone providing server 20; a ringtone separator 14 configured to receive the ringtone message from the sender-specific incoming ringtone providing server 20 and separate only ringtone data from the ringtone message; and a voice output controller 15 configured to control the ringtone data to be output.

Meanwhile, the user terminals 2*a* and 2*b* include a text message reception detector 16 configured to monitor whether text message data is received; a data storage 17 configured to store an application attaching the ringtone message and separating the ringtone from the received ringtone message, and a ringtone setting control data to be transmitted to the counterpart terminal; and a controller 18 configured to control the components to create, attach, transmit data desired to be output as a ringtone in the counterpart terminal, and receive the ringtone message from the counterpart and automatically setting the data as the ringtone to be output.

Further, the user terminals 2*a* and 2*b* further include an incoming ringtone recorder 6 configured to record a voice of a sender as a message to be set as the ringtone of the receiver-side user terminal.

In addition, the voice output controller 15 is a means for controlling setting of the ringtone, and controls the application of the counterpart user terminal so that the ringtone message transmitted by the sender is set as a temporary ringtone one time only, and original ringtone setting is automatically restored after outputting the ringtone message.

Figure 3:
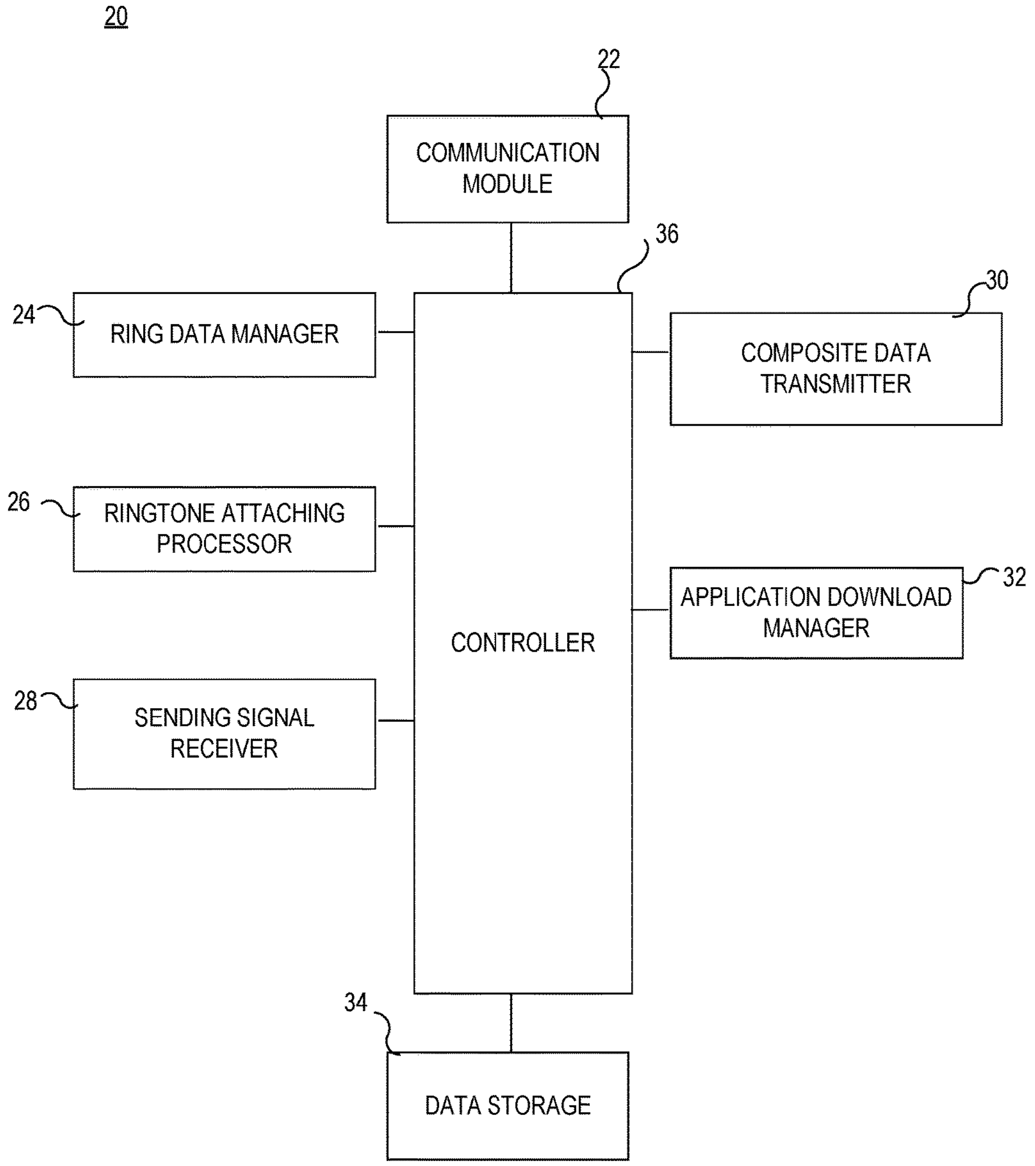
FIG. 3 is a block diagram illustrating a configuration of a sender-specific incoming ringtone providing server included in the system for switching and outputting a sender-controlled incoming ringtone according to the embodiment of the present invention.

FIG. 3 is a block diagram illustrating a configuration of the sender-specific incoming ringtone providing server included in the system for switching and outputting a sender-controlled incoming ringtone according to the embodiment of the present invention.

Referring to FIG. 3, the sender-specific incoming ringtone providing server 20 includes a communication module 22 configured to communicate with the user terminals 2*a* and 2*b*; a ring data manager 24 configured to manage the ring data which is information of the counterpart of a call so as to be transmitted to a terminal of the counterpart of the call, respectively; and a ringtone attaching processor 26 configured to attach the ringtone data transmitted by the sender to the ring data of the sender to be transmitted to the receiving-side user terminal.

The sender-specific incoming ringtone providing server 20 includes a sending signal reception unit 28 configured to receive a sending signal for a specific receiver phone number from the sending-side user terminal 2*a*; a composite ring data transmitter 30 configured to transmit composite ring data including the ringtone; and an application download manager 32 configured to manage the application performing attachment of the ringtone message and setting control so as to be downloaded to the user terminals 2*a* and 2*b*.

Further, the sender-specific incoming ringtone providing server 20 includes a data storage 34 configured to store the application performing attachment of the ringtone message and setting control in a manner that it may be downloaded by multiple user terminals, and store the ringtone message which is received from the sending-side user terminal and transmitted to the receiving-side user terminal; and a controller 36 configured to control components so that the ringtone message desired by the sender is transmitted to the sending-side user terminal to replace the ringtone informing of call connection request or the text message arrival notification signal to be output.

Next, functions and operation of the system for switching and outputting a sender-controlled incoming ringtone according to the embodiment of the present invention having the above-described configuration will be described in detail with reference to the accompanying drawings.

Figure 4:
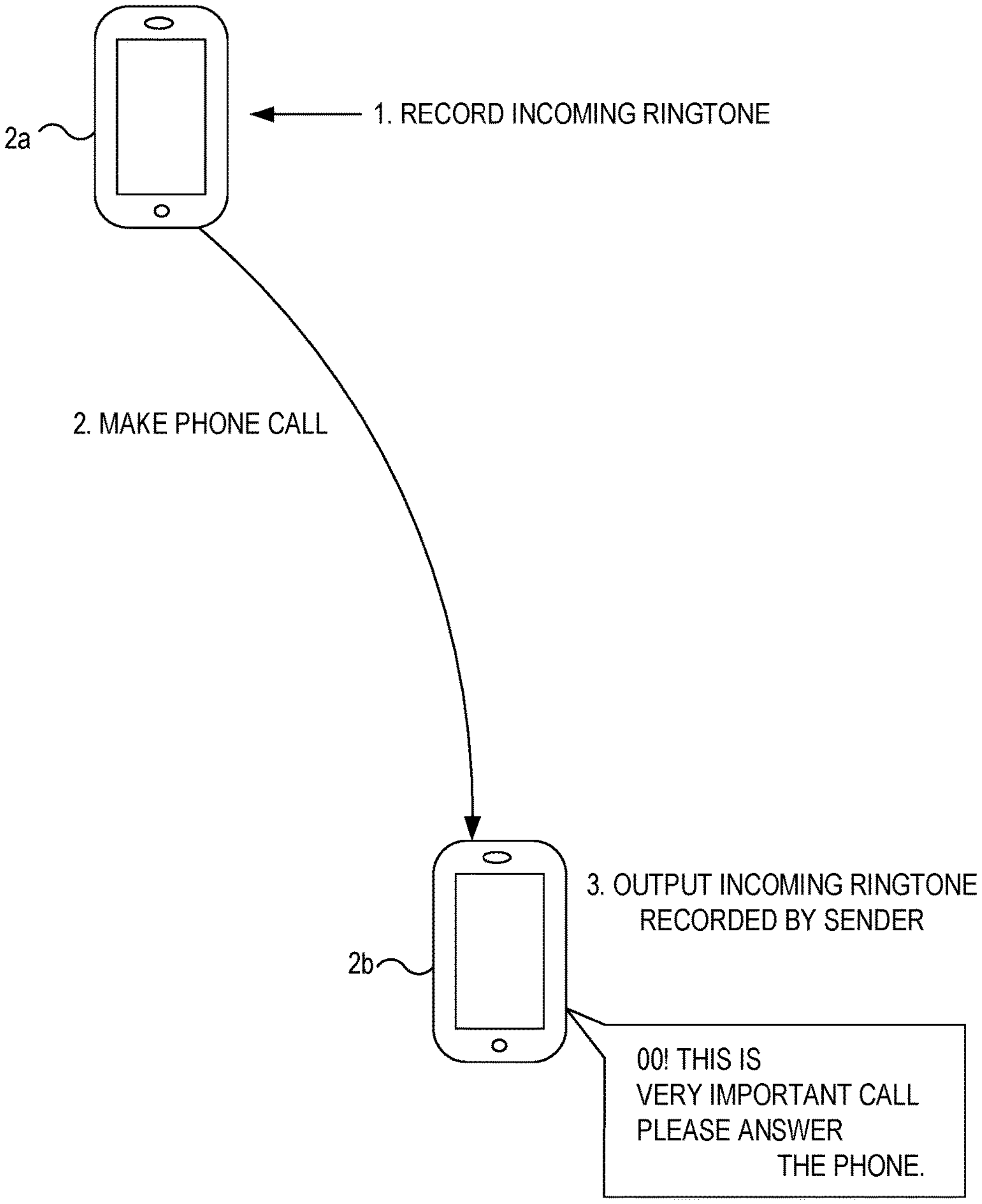
FIG. 4 is a diagram schematically illustrating a state in which an incoming ringtone is switched with recording information of a sender through the system for switching and outputting a sender-controlled incoming ringtone according to the embodiment of the present invention.
Figure 5:
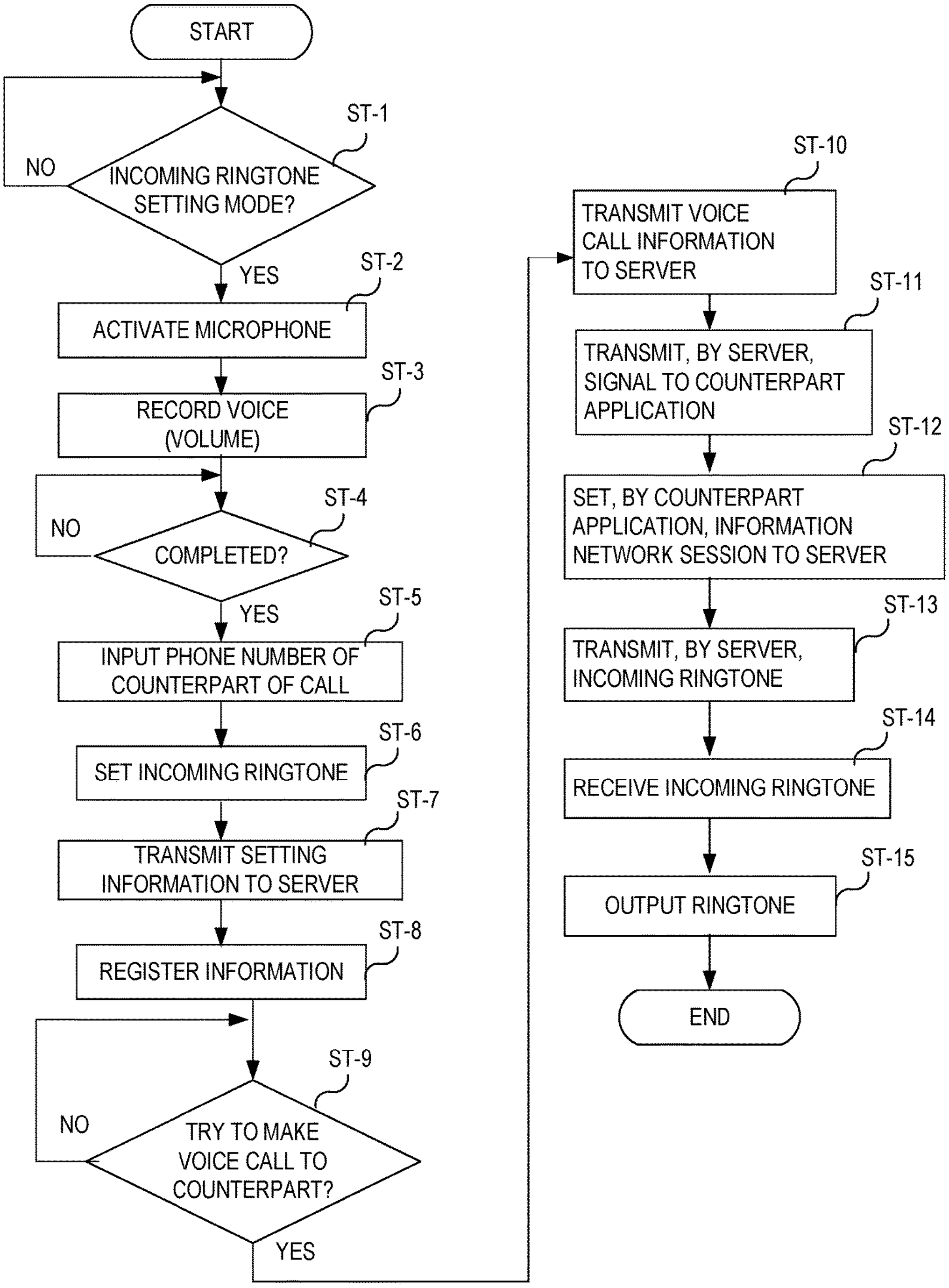
FIG. 5 is a flowchart illustrating a step of switching the incoming ringtone with the recording information of the sender through the system for switching and outputting a sender-controlled incoming ringtone according to the embodiment of the present invention.

FIG. 4 is a diagram schematically illustrating a state in which an incoming ringtone is switched with recording information of a sender through the system for switching and outputting a sender-controlled incoming ringtone according to the embodiment of the present invention, and FIG. 5 is a flowchart illustrating a step of switching the incoming ringtone with the recording information of the sender through the system for switching and outputting a sender-controlled incoming ringtone according to the embodiment of the present invention.

First, the system for switching and outputting a sender-controlled incoming ringtone according to the embodiment of the present invention is a system in which a sender arbitrarily sets a ringtone or a notification sound of a receiver to be output, wherein the ringtone or the notification sound notifies a voice call or text message transmission.

In this case, it is preferable that output of the ringtone or the notification sound set by the sender is limited to one time, so that the ringtone or the notification sound set by the sender is not continued.

Describing the operation in detail, the sender controls the application of the sending-side user terminal 2*a* to be changed to an incoming ringtone setting mode.

In the incoming ringtone setting mode, the sender operates the application of the sending-side user terminal 2*a* to set the ringtone. The ringtone message to be output in a specific receiving-side user terminal 2*b* is set by selecting a sound source data or recording a voice by the sender.

That is, the sender may set the ringtone of the receiving-side user terminal 2*b* by selecting specific data such as the sound source data or by personally recording his/her own voice and transmitting the recorded voice to the receiving-side user terminal 2*b* so as to be set as the ringtone of the receiving-side user terminal.

When the sender desires to record his/her own voice and set the recorded voice as the ringtone, the sender needs to activate a microphone through the application of the sending-side user terminal 2*a* and record the voice, and the recorded voice data is transmitted to the sender-specific incoming ringtone providing server 20.

In this case, the ringtone message transmitted by the sender to the sender-specific incoming ringtone providing server 20 is data specified for each receiver, therefore, a step of attaching a receiver phone number to each ringtone message is further performed.

In addition, the sender-specific incoming ringtone providing server 20 registers the ringtone message together with receiver and sender information.

In such state, when the sender tries to make a voice call to the receiver, the application of the sending-side user terminal 2*a* transmits a notification signal notifying that the sender tries to make a voice call to the application of the receiving-side user terminal 2*b*.

At the same time, the application of the sending-side user terminal 2*a* may transmit the notification signal notifying that the sender tries to make a voice call to the specific receiver to the sender-specific incoming ringtone providing server 20. Of course, this signal may not be transmitted.

Then, the application of the receiving-side user terminal 2*b* transmits a signal requesting transmission of the ringtone message to the sender-specific incoming ringtone providing server 20. In this case, phone number information of the sender is also included in the request signal and transmitted.

Then, the sender-specific incoming ringtone providing server 20 extracts the ringtone message matched to the receiver phone number and sender phone number by the signal, and transmits the extracted ringtone message to the receiving-side user terminal 2*b*.

The sender-specific incoming ringtone providing server 20 creates composite ring data formed by extracting the ringtone message registered by the sender and the ring data of the sender, and transmits the created composite ring data to the receiving-side user terminal 2*b*.

Then, the application of the receiving-side user terminal 2*b* separates the ring data and the ringtone message of the sender from each other, sets the ringtone message as the ringtone informing of a voice call, and outputs the ringtone message through a speaker or a buzzer.

In this case, the ringtone message may be sound source data, thus the receiver may answer the phone while enjoying a music transmitted by the sender, and in a case of the ringtone message is a voice of the sender, the voice of the sender saying "This is an urgent call, please answer the phone" may be output as the ringtone by the receiver, thereby making the receiver to think that he/she should promptly answer the phone call from the sender even when the receiver is busy for other works.

Figure 6:
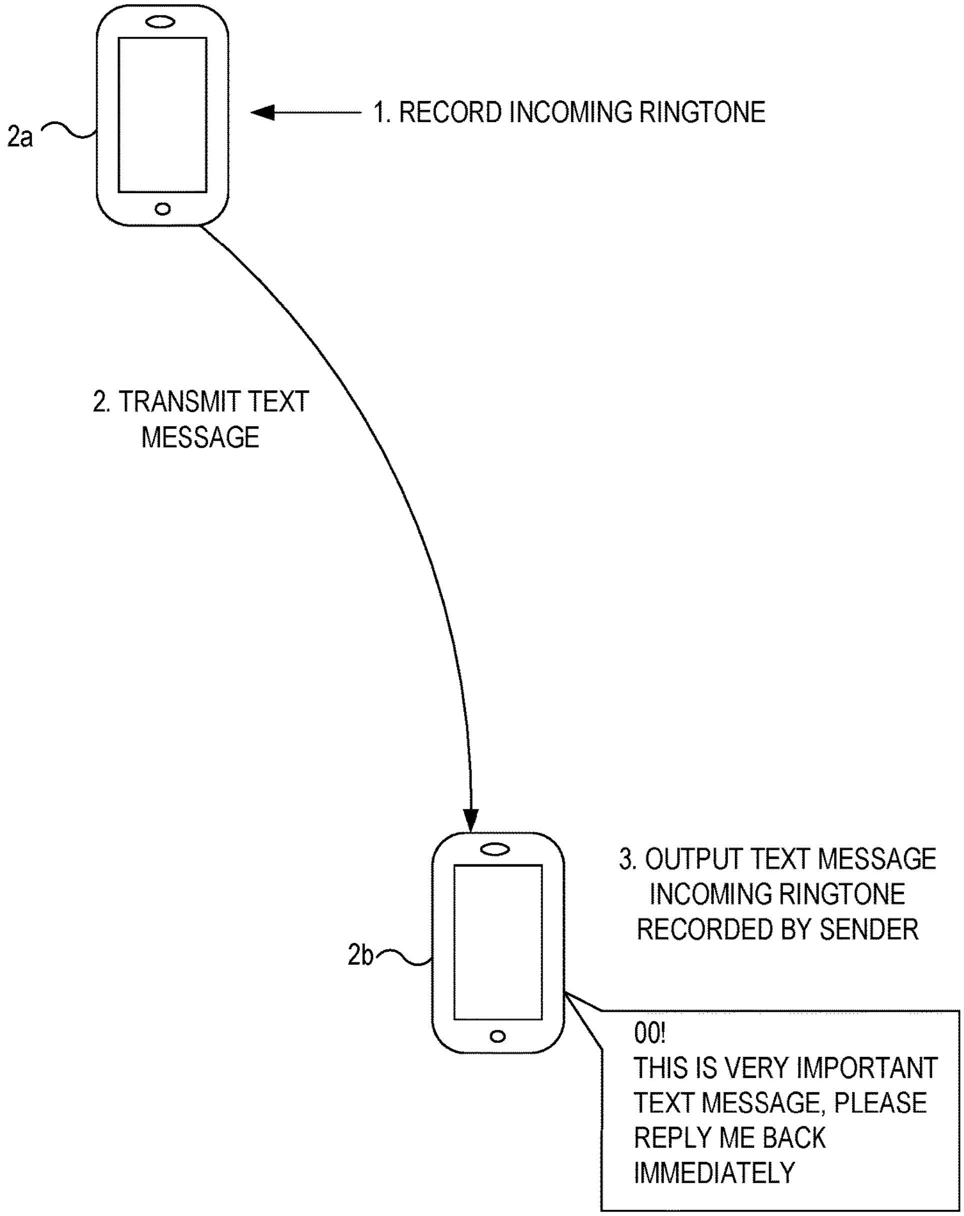
FIG. 6 is a diagram schematically illustrating a state in which the recording information of the sender is replaced with the incoming ringtone at the time of text message transmission through the system for switching and outputting a sender-controlled incoming ringtone according to the embodiment of the present invention.
Figure 7:
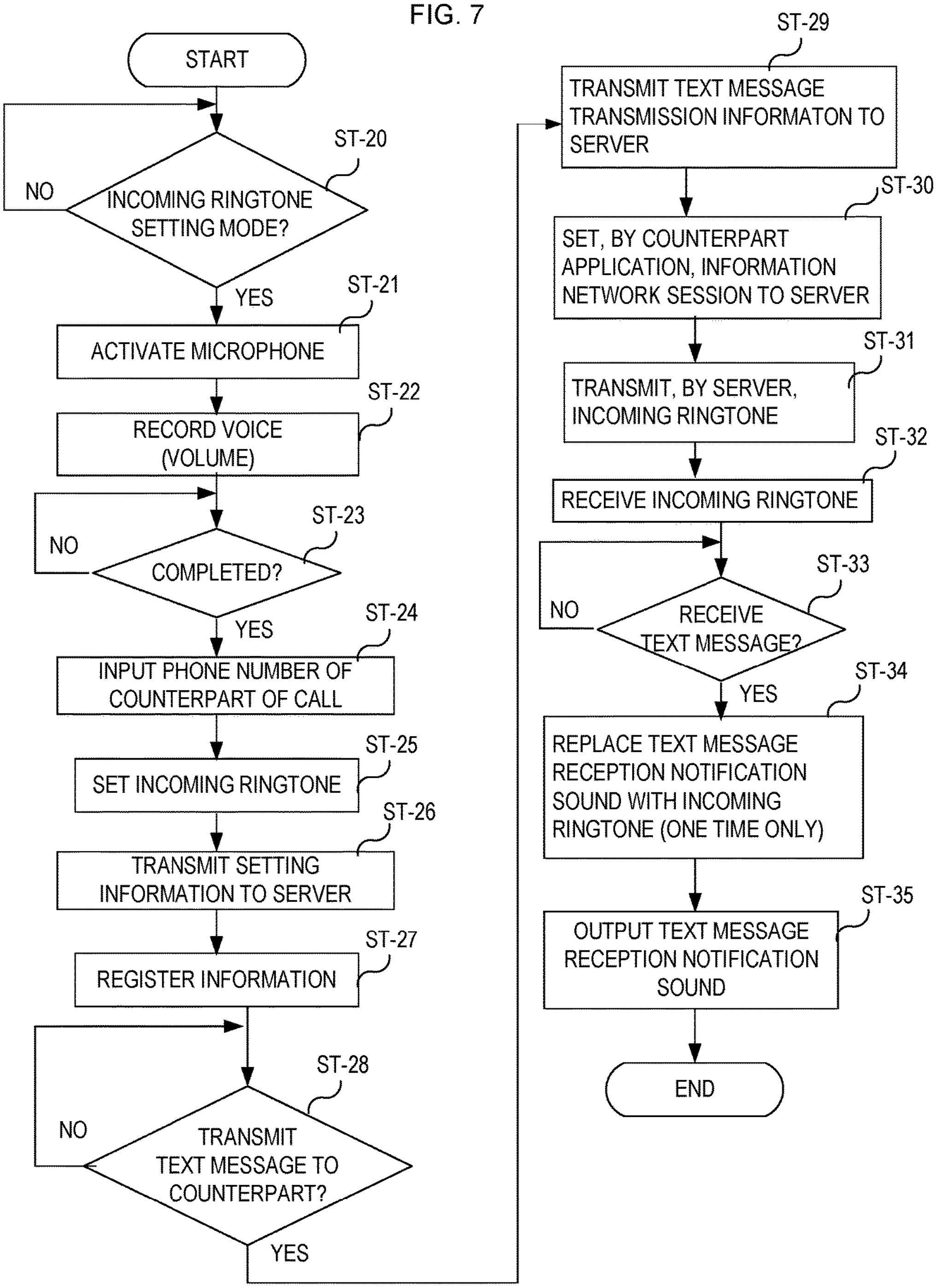
FIG. 7 is a flowchart illustrating a step of replacing the recording information of the sender with the incoming ringtone at the time of text message transmission through the system for switching and outputting a sender-controlled incoming ringtone according to the embodiment of the present invention.

FIG. 6 is a diagram schematically illustrating a state in which the recording information of the sender is replaced with the incoming ringtone at the time of text message transmission through the system for switching and outputting a sender-controlled incoming ringtone according to the embodiment of the present invention, and FIG. 7 is a flowchart illustrating a step of replacing the recording information of the sender with the incoming ringtone at the time of text message transmission through the system for switching and outputting a sender-controlled incoming ringtone according to the embodiment of the present invention.

First, FIGS. 6 and 7 are views for describing a step of setting, by the sender, the reception notification signal at the time of text message transmission through the system for switching and outputting a sender-controlled incoming ringtone according to the embodiment of the present invention.

That is, the system for switching and outputting a sender-controlled incoming ringtone according to the embodiment of the present invention is a system in which a sender arbitrarily sets a notification signal of a receiver to be output, wherein the notification signal notifies the reception of text message data. In this case, it is preferable that output of the notification signal set by the sender is limited to one time, so that the notification signal set by the sender is not continued.

Describing the operation in detail, the sender controls the application of the sending-side user terminal 2*a* to be changed to an incoming notification signal setting mode.

In the incoming notification signal setting mode, the sender operates the application of the sending-side user terminal 2*a* to set the notification signal. The notification signal data to be output in a specific receiving-side user terminal 2*b* is set by selecting a sound source data or recording a voice by the sender.

That is, the sender may set the notification signal of the receiving-side user terminal 2*b* by selecting specific data such as the sound source data or by personally recording his/her own voice and transmitting the recorded voice to the receiving-side user terminal 2*b* so as to be set as the ringtone of the receiving-side user terminal.

When the sender desires to record his/her own voice and set the recorded voice as the notification signal, the sender needs to activate a microphone through the application of the sending-side user terminal 2*a* and record the voice, and the recorded voice data is transmitted to the sender-specific incoming ringtone providing server 20.

In this case, the notification signal data transmitted by the sender to the sender-specific incoming ringtone providing server 20 is data specified for each receiver, therefore, a step of attaching a receiver phone number to each notification signal data is further performed.

Further, the sender-specific incoming ringtone providing server 20 registers the notification signal data together with receiver and sender information.

In such state, when the sender tries to transmit a text message to the receiver, the application of the sending-side user terminal 2*a* transmits a notification signal notifying that the sender tries to transmit a text message to the application of the receiving-side user terminal 2*b*. More precisely, an SMS providing server 40 transmits a text message to the receiving-side user terminal 2*b*, and the receiving-side user terminal 2*b* generates the text message reception notification signal.

At the same time, the application of the sending-side user terminal 2*a* transmits the text message transmission signal for the specific receiver to the sender-specific incoming ringtone providing server 20.

Then, the application of the receiving-side user terminal 2*b* transmits a signal requesting transmission of the notification signal data to the sender-specific incoming ringtone providing server 20. In this case, phone number information of the sender is also included in the request signal and transmitted.

Then, the sender-specific incoming ringtone providing server 20 extracts the notification signal data matched to the receiver phone number and sender phone number by the signal, and transmits the extracted notification signal data to the receiving-side user terminal 2*b*.

The sender-specific incoming ringtone providing server 20 creates composite ring data formed by extracting the notification signal data registered by the sender and the ring data of the sender, and transmits the created composite ring data to the receiving-side user terminal 2*b*.

Then, the application of the receiving-side user terminal 2*b* separates the ring data and the notification signal data of the sender from each other, sets the notification signal data as the notification signal of a voice call, and outputs the notification signal through the speaker or the buzzer.

In this case, the notification signal data may be sound source data, thus the receiver may read the text message while enjoying a music transmitted by the sender, and in the case of the notification signal data is a voice of the sender, the voice of the sender saying "This is an urgent message, please call me immediately" may be output as the text message reception notification signal by the receiver, thereby making the receiver to think that he/she should promptly read the text message from the sender even when the receiver is busy for other works.

Accordingly, in the system for switching and outputting a sender-controlled incoming ringtone and the method therefor according to the embodiment of the present invention, a sender may allow a receiver to output a sound source at the time of outputting the ringtone or the text message reception notification signal as gifts, and in a case of urgent call or urgent text message, the sender may record his/her own voice to replace the ringtone or the text message reception notification signal of the receiver such that the receiver does not reject the call or the text message but may immediately answer the call or read the text message, thereby significantly improving convenience of users.

Meanwhile, the system for switching and outputting a sender-controlled incoming ringtone and the method therefor are not limited to the above-described embodiments, and it will be understood by those skilled in the related art that various modifications and variations may be made therein without departing from the scope of the present invention as defined by the appended claims.

The invention claimed is:

1. A system for switching and outputting a sender-controlled incoming ringtone, comprising:

a sending-side user terminal and a receiving-side user terminal, wherein two applications transmitting a ringtone message to be output while being converted into a voice to replace a ringtone notifying of an incoming call or a notification signal for arrival of a text message from the sending-side user terminal, receiving the ringtone message at the receiving-side user terminal, and automatically setting and outputting the ringtone message as the ringtone or the notification signal for arrival of a text message, are installed, one application in the sending-side user terminal and one application in the receiving-side user terminal; and a server configured to receive and register the ringtone message to be transmitted to the receiving-side user terminal from the sending-side user terminal, receive a call connection request signal or a text message transmission request signal from the application of the sending-side user terminal, receive a signal requesting transmission of the ringtone message from the receiving-side user terminal, wherein the signal requesting transmission of the ringtone message includes a phone number of the sending-side user terminal, extract the ringtone message, and transmit the extracted ringtone message to the receiving-side user terminal, wherein the ringtone message is data specified for each receiver and comprises a receiver phone number and a ringtone setting control signal, wherein the ringtone setting control signal is for automatically setting the ringtone message as the ringtone or the notification signal for arrival of a text message, wherein the receiving side user terminal is configured to receive a notification signal for a voice call from the sending-side user terminal, and, in response to receiving the notification signal for a voice call, send the signal requesting transmission of the ringtone message to the server, wherein the server is further configured to, in response to receiving the signal requesting transmission of the ringtone message from the receiving-side user terminal, extract a pre-registered ringtone message that matches the receiver phone number in the ringtone message received from the sender-side user terminal and the phone number of the sending side user terminal in the signal requesting transmission of the ringtone message received from the receiving-side user terminal, and wherein the receiving-side user terminal comprises a voice output controller configured to control a ringtone data to be output, wherein the voice output controller controls setting of the ringtone of the receiving-side user terminal based on the ringtone setting control signal so that the ringtone message is output only one time and followed by an original ringtone.

2. The system of claim 1, wherein the server further performs ring data management for transmitting ring data pre-registered by each user to a counterpart's terminal, respectively, at the time of trying to make a voice call or transmit a text message.

3. The system of claim 1, wherein the ringtone message includes at least one of text data, recording data, and sound source data of a sender that is input or recorded through the sending-side user terminal.

4. The system of claim 1, wherein the server is configured to receive a voice call signal or a signal informing of text message transmission, the ringtone message and the ringtone setting control signal from the application of the sending-side user terminal, and push the ringtone message to the receiving-side user terminal.

5. The system of claim 1, wherein the application of the receiving-side user terminal receives a voice call signal generation or text message transmission signal for a specific receiver, or a signal regarding whether a ringtone message for the specific receiver is present from the application of the sending-side user terminal, and generates the signal requesting transmission of the ringtone message.

6. The system of claim 1, wherein the ringtone message transmitted from the providing server further includes sender information and the ringtone setting control signal.

7. A method for switching and outputting a sender-controlled incoming ringtone, comprising:

a) setting, by an application of a sending-side user terminal, a ringtone message, wherein the ringtone message is data specified for each receiver and comprises a receiver phone number and a ringtone setting control signal, wherein the ringtone setting control signal is for automatically setting the ringtone message as a ringtone or a notification signal for arrival of a text message on a receiving-side user terminal;

b) transmitting, by the application of the sending-side user terminal, the ringtone message to a server;

c) registering, by the server, the ringtone message together with receiver and sender information;

d) transmitting, by the application of the sending-side user terminal, a notification signal notifying that a sender tries to make a voice call to an application of the receiving-side user terminal;

d1) in response to receiving the notification signal, transmitting, by the receiving-side user terminal, a sender phone number and a signal requesting transmission of a ringtone message to the server;

d2) in response to receiving the sender phone number and the signal requesting transmission of a ringtone message, extracting, by the server, a registered ringtone message that matches the receiver phone number in the ringtone message transmitted from the sender-side user terminal and the sender phone number transmitted from the receiving-side user terminal;

e) downloading, by the receiving-side user terminal, the extracted ringtone message from the server;

f) changing, by a voice output controller of the receiving-side user terminal configured to control a ringtone data to be output, a setting of a ringtone of the receiving-side user terminal based on the ringtone setting control signal so that the ringtone message is output only one time and followed by an original ringtone; and g) outputting, by the receiving-side user terminal, the downloaded ringtone message.

8. The method of claim 7, wherein in the step a), the ringtone message to be output in the receiving-side user terminal is set by selecting sound source data or recording a voice by a sender.

9. The method of claim 7, wherein the step e) comprises:

extracting, by the server, the ringtone message and ring data of the sender to create composite ring data; and transmitting, by the server, the composite ring data to the receiving-side user terminal.

10. The method of claim 9, further comprising:

before the step f), separating, by the receiving-side user terminal, the ring data and the ringtone message from each other; and setting the ringtone message as a ringtone informing of a voice call or a text message reception notification signal.

* * * * *